Aug. 9, 1932. H. F. MAUREL 1,870,521
APPARATUS FOR CARBONIZATION OF FUEL BRIQUETTES
Filed March 5, 1929 2 Sheets-Sheet 1
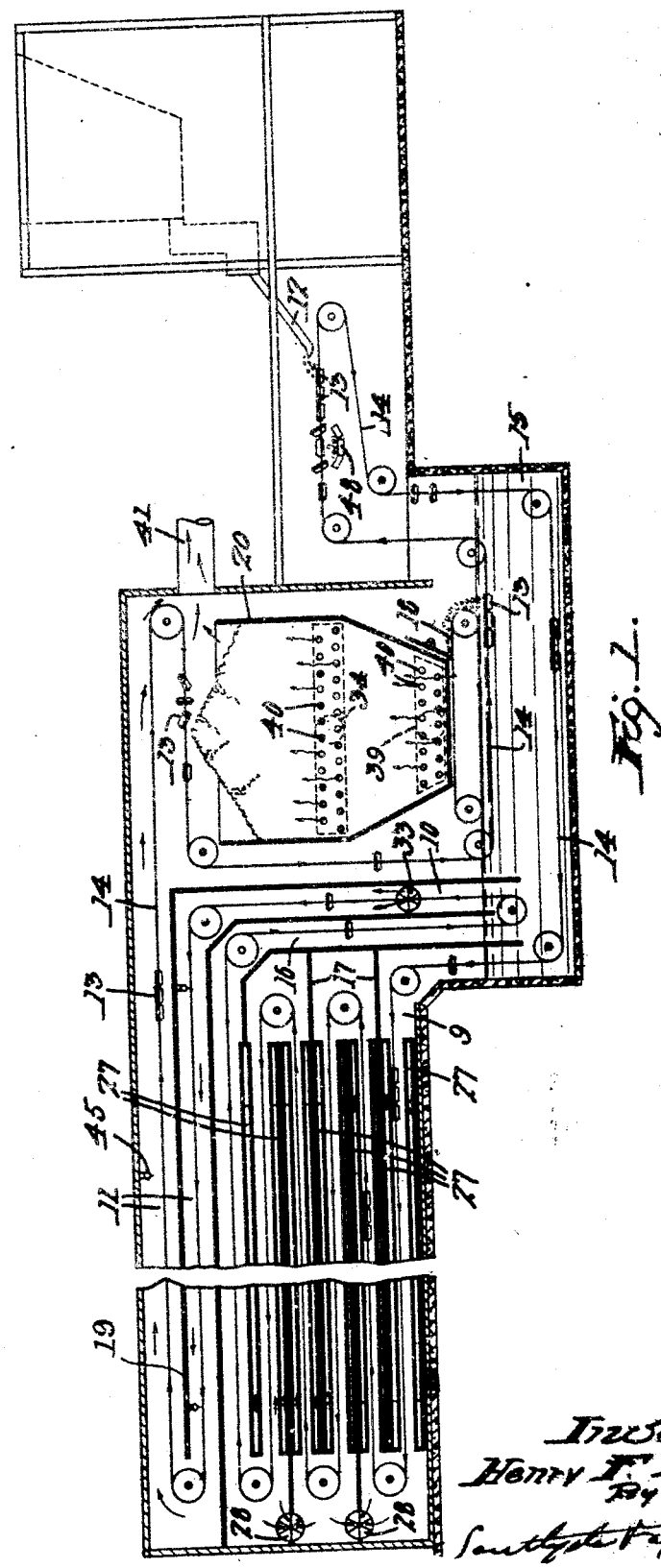

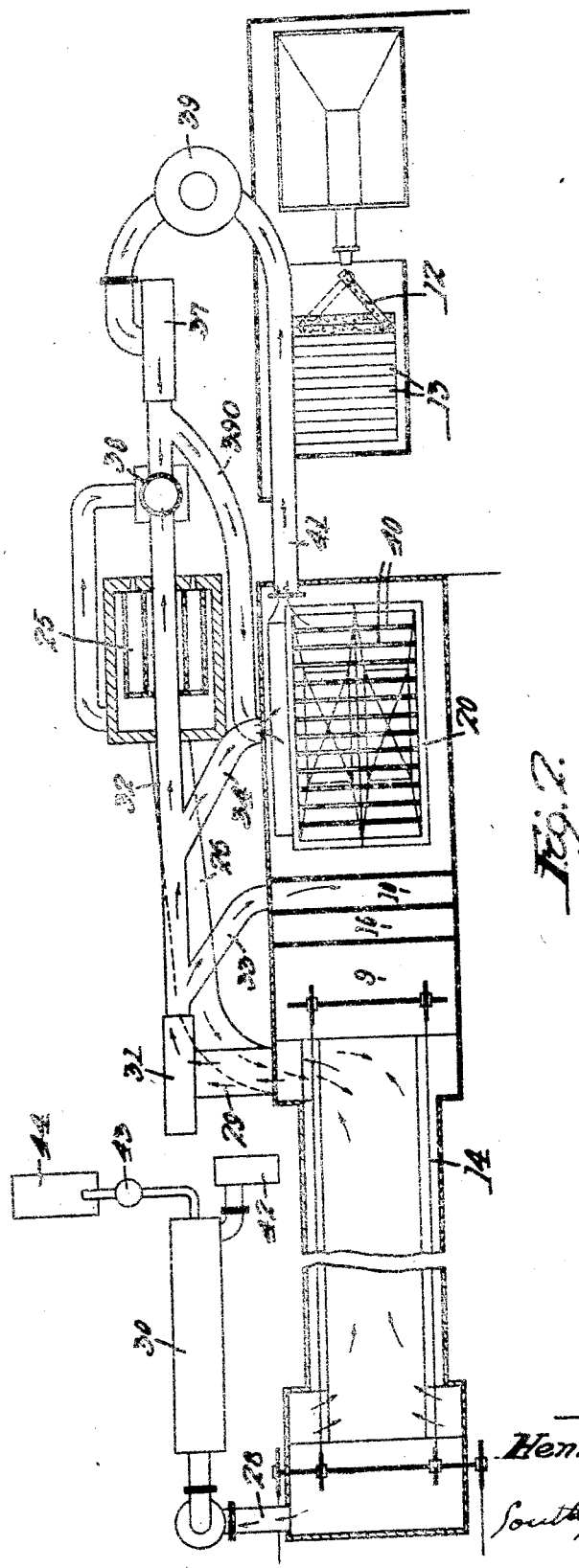

Patented Aug. 9, 1932

1,870,521

UNITED STATES PATENT OFFICE

HENRY F. MAUREL, OF PROVIDENCE, RHODE ISLAND, ASSIGNOR TO MAUREL INVESTMENT CORPORATION, A CORPORATION OF RHODE ISLAND

APPARATUS FOR CARBONIZATION OF FUEL BRIQUETTES

Application filed March 5, 1929. Serial No. 344,478.

This invention relates to the treating of coals for the purpose of producing from them briquettes for use as fuel.

The principal objects of the invention are to provide an apparatus by which the coal previously pulverized and formed into soft briquettes, held together by hydrocarbons and moisture, is first subjected to a distillation process, by indirect heat only, at a comparatively low temperature, without any contamination with furnace gases, so that a useful degree of steam distillation of the oil results from vaporization of the contained water of the green briquette and provide a maximum recovery of by-products and then passed through a hardening zone in which the product remains undisturbed and is subjected to direct heat from a blast of products of combustion, preferably the same gases used in heating the first zone, for the purpose of hardening the material, and "asphaltizing" part of the oil still in the fuel, and finally subjected to a retorting process where the briquettes can receive mass treatment for the purpose of completing the preparation of the briquettes for use in furnaces and the like and also to provide liquid sealing members whereby the carrying of the briquettes continuously through the three ones is not affected and yet the first two zones are effectively sealed from each other, thus keeping each stage of the process distinct and separate, although the whole process is continuous for a long period of time.

The invention also involves the apparatus on which the three zones are located and a central liquid sealing member for separating the second zone from the first and involves the utilization of the liquid sealing member for the discharge and introduction of the briquettes.

Other objects and advantages of the invention will appear hereinafter.

Reference is to be had to the accompanying drawings in which

Fig. 1 is a vertical section through a preferred embodiment of the apparatus showing how the process can be carried out in an effective manner, and Fig. 2 is a horizontal sectional view of the same showing the outside connections in plan.

This process is applied to the utilization of coal in which the coal is first ground fine and mixed thoroughly with an asphalt base fuel oil, or other suitable binder, to make a plastic mass, and then extruded through a nozzle and cut off to form briquettes which may be of cylindrical form, or otherwise. The binder is waterproof preferably so that when the briquettes are introduced through a seal, water or other liquid, they will not absorb much moisture.

This process begins with the delivery of the soft briquettes thus formed down through a chute 12 into a series of baskets 13 which are pivotally mounted on an endless conveyor 14 which traverses throughout the three zones of the device. The baskets loaded with briquettes pass under the chute 12 to the right and down into a liquid seal tank 15 which contains a considerable amount of water or other liquid and they then, going over certain guide and supporting rolls or sprockets, pass upwardly into a distilling chamber 9 of the oven. Without describing at the present time the method of heating the various zones, it is sufficient to say that the conveyor 14 passes back and forth through the chamber 9, which constitutes a distilling zone, and there the briquettes receive heat, in a way to be described but always indirect heat, so they do not come into contact with any products of combustion. The course of the conveyor through this chamber is back and forth but continuously upward and finally the conveyor comes down through a vertical passage 16 at the end of this chamber into the tank 15 and upwardly through a second vertical passage 10. This constitutes a second liquid sealing means.

It will be seen that the briquettes have to pass through the liquid between these two passages, the first of which is heated by indirect heat and then goes upwardly from the passage 10 into a horizontal passage 11 which is divided by a horizontal floor or partition 19. The briquettes in these passages 10 and 11, which constitute a second chamber in the oven, are subjected to the direct products of combustion and baked or hardened. The conveyor 14 passes out of the upper passage 11 horizontally into the top of a retort compartment, preferably located within the walls of the same oven, and constituting the third chamber or zone of this process. This is provided with a retort 20 capable of receiving an immense amount of briquettes and the baskets are automatically turned over when they pass the center of this retort which is open at the top and dump the now distilled and hardened products into it. They are treated in this retort, as will be described hereinafter, and dropped out on a conveyor 18 which operates continuously and dumps these briquettes in the baskets 13 of the conveyor 14 on the return strand under water so that they are passed through a third liquid seal, all shown as contained in the tank 15. The conveyor then moves upwardly to the discharge point where they are dumped on the transverse conveyor 48 and delivered from this apparatus.

These various chambers or zones can be heated in different ways and I have shown in Fig. 2 a convenient way of providing the necessary heat and cutting down the temperature which has to be done. Heated gases, such as products of combustion, are generated in a furnace 25 and a pipe or conduit 26 is shown for introducing the gases into the bottom of the distilling chamber 9. In that zone the heated gases pass through conduits 27 which are not open to the interior of the furnace and goes back and forth on opposite sides of the horizontal partitions 17 which are provided to deflect the heated gases therein. At the end of the furnace in the distilling zone there are outlet pipes 28 which deliver into a tower and from the top of that through a condenser 30 which is operated by a pump 42. The lighter constituents distilled off from the coal and oil, after having been condensed, are separated by a separator 43 and delivered to an oil tank 44 and recovered.

The heating gases pass out from the top of this distilling zone through a conduit 29 and a booster fan 31 draws them out and forces them along a pipe 32. This has a branch 33 which delivers the gases into the bottom of the hardening chamber 10. In this case the conduit is open in this zone so the products of combustion pass through it and they pass up around the top partition and over into an outlet 41. It will be noticed that in their course the products of combustion move along the endless conveyor 14 to the point where it delivers the briquettes to the retort 20.

The pipe or conduit 32 has another branch 34 which opens into a series of perforated pipes 40 located about the center of the retort 20, extending across the same horizontally, thereby introducing the products of combustion heated to a sufficient temperature in this mass. The conduit 32 extends to the stack 38 which also is open to the furnace 25 to recirculate any proportion of the excess products of combustion required to regulate the temperature of the gases leaving said furnace.

The outlet 41 passes to a tar trap 39 where the tar is extracted and through an exhaust fan 37 which draws the products of combustion out of the furnace and this fan is connected to the stack 38 and is also provided with a branch 390 which takes the cooled gases into the bottom of the retort 20, where there is another set of perforated pipes 40 extending across the retort at the bottom, thus delivering cooler gases into the bottom of the retort, at will, to control the temperature down in the retort.

It will be seen that the briquettes, being provided with binding material consisting of an oil such as described, can be passed through the water seals without their absorbing much water, that the intermediate water seal separates the distilling chamber from the retorting chamber and the hardening chamber from both. In this way the indirect or radiant heat in the distilling chamber will take off some of the oil from the briquettes and the volatile constituents from the coal and pass them into the condenser but otherwise it is entirely sealed from other gases and especially from the products of combustion from the furnace. The operation taking place in the hardening chamber 11 is entirely independent from that taking place in the distilling chamber, no mixture from one to the other being possible.

I have described above a preferred embodiment of my invention utilizing an intermediate liquid seal. It must be understood, however, that it is quite feasible to isolate any two zones from one another mechanically. I prefer the liquid seal because it is more positive and free of any possible mechanical troubles, although mechanical seals are sufficiently effective to be entirely practical.

The operation in the retorting chamber is fully shown and described in my prior application, Serial No. 295,203, filed July 25, 1928.

It will be seen therefore that each stage of the process is completely isolated from the others and yet continuity of the process is not interrupted. By the use of the products of combustion for producing the indirect heat in the first zone and used immediately afterwards at almost the same temperature in the second and third zones, increased thermal efficiency is provided and this efficiency is practically improved by the use of the same liquid seal for the entry and exit for the product laden conveyor and for the intermediate zone. The positive isolation of the first two chambers thus provided is of particular importance as it permits of the recovery of the products distilled in the first chamber, where only indirect heat is used, without danger of contamination by gases used as direct heat in subsequent chambers.

The product is hardened in the hardening chamber by the blast of furnace gases enough to permit of efficient and economical treatment in the retorting chamber, where, as has been stated, it receives mass treatment and a large quantity of the material is always being acted upon.

I have also found that light rays of any suitable kind may be used to good advantage in certain stages of baking, particularly in the second chamber where the product, I have found, hardens more rapidly when illuminated than in the dark. For this purpose I have indicated certain electric lights 45 in that chamber.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. In an apparatus for carbonizing ground coal briquettes, the combination of a distilling chamber having means for heating it by indirect heat, means for protecting said chamber from direct heat, a hardening chamber having means for heating it by direct heat, an endless conveyor adapted to carry the briquettes back and forth through the first chamber and then into the second chamber and finally discharging them, and means for keeping the gases in said chambers from mixing.

2. In an apparatus for carbonizing ground coal briquettes, the combination of a distilling chamber having means for heating it by indirect heat, means for protecting said chamber from direct heat, a hardening chamber having means for heating it by direct heat, a carbonizing chamber having means for heating it by direct heat, an endless conveyor adapted to carry the briquettes back and forth through the first chamber and then into the second chamber and from that into the third chamber and finally discharging them, and a liquid sealing member through which the conveyor passes for preventing the products of combustion from the second chamber entering the first chamber.

3. In an oven for treating ground fuel briquettes, the combination of a closed distilling compartment, conduits passing through said compartment for heating it by radiant heat, a hardening compartment in said oven, means for conducting the heated gases from conduits in the first compartment into said second compartment and guiding them through the same, a conveyor for continuously conveying the briquettes back and forth through the first compartment, then out of this and into the second compartment, and finally outside the oven, and a single liquid sealing member for preventing communication between the gaseous contents of the first and second compartments, said conveyor passing down into the liquid seal a plurality of times for that purpose.

4. In an oven for treating ground fuel briquettes, the combination of a closed distilling compartment therein, conduits passing through said compartment in said oven, a hardening compartment, means for conducting the heated gases from conduits in the first compartment into said hardening compartment and guiding them through the same, a carbonizing compartment having a retort therein, means for leading the products of combustion into the third compartment, a conveyor for continuously conveying the briquettes back and forth through the first compartment, then out of this and into the second compartment and into the third compartment and finally outside the oven, and a single liquid sealing member for preventing communication between the gaseous contents of the first and second compartments, said conveyor passing down into the liquid seal a plurality of times for that purpose.

5. In an oven for treating fuel briquettes, the combination with an external casing, of partitions therein for dividing the oven into a plurality of compartments, one of said partitions involving a vertical and horizontal part providing a compartment reaching part way to the top of the casing for distillation purposes, another partition involving a vertical and horizontal part, the horizontal part being located above the horizontal part of the first partition and providing an L-shaped compartment and comprising a space above the upper partition, in which compartment the briquettes can be hardened, an endless conveyor for conveying the briquettes into the bottom of the first compartment from below and back and forth therein, along the top of the first compartment and down therein to the bottom of the first named partition and below it and then directly up into the second compartment, a third compartment for carbonizing being adapted to receive the briquettes from the second compartment, and a water sealing member sealing the first two compartments from each other and receiving the conveyor where it passes below the first named partition.

6. In an oven for preparing fuel briquettes, the combination of a distilling chamber for distilling off the volatile constituents of the binding material in the briquettes, a hardening chamber for hardening or baking the briquettes thereafter, a carbonizing chamber having means for finally preparing the briquettes for use as fuel, means for introducing the briquettes into the distilling chamber, passing them into the hardening chamber and finally passing them through the carbonizing chamber and out again, a furnace having connections for directing its heated products of combustion through the distilling chamber without discharging any of them into the interior of said chamber and thereafter introducing the products of combustion into the hardening chamber to come into contact with the briquettes therein, means for introducing some of the exhaust gases from the distilling chamber into the carbonizing chamber, and means for discharging the gases from the carbonizing chamber.

7. In an oven for preparing ground coal briquettes, the combination of a distilling chamber for distilling off the volatile constituents of the binding material in the briquettes, a hardening chamber communicating with the distilling chamber for hardening or baking the briquettes thereafter, a retort chamber communicating with the hardening chamber and having means for finally preparing the briquettes for use as fuel, means for introducing the briquettes into the distilling chamber, passing them into the hardening chamber and finally passing them through the retort chamber and out again, a furnace having connections for directing its heated products of combustion through the distilling chamber without discharging any of them into the interior of said chamber and then introducing the products of combustion into the hardening chamber to come into contact with the briquettes therein, means for introducing some of the exhaust gases from the distilling chamber into the retort chamber, and means for discharging the gases from the retort chamber and means whereby the last named gases when reduced in temperature can be introduced back into the oven to keep the temperature thereof down.

8. In an oven for preparing fuel briquettes, the combination of a distilling chamber for distilling off the volatile constituents of the binding material in the briquettes, a hardening chamber not communicating with the distilling chamber for hardening or baking the briquettes thereafter, means for introducing the briquettes into the distilling chamber, passing them into the hardening chamber and finally passing them out again, a furnace having connections for directing its heated products of combustion through the distilling chamber without discharging any of them into the interior of said chamber and then introducing the products of combustion into the hardening chamber to come into contact with the briquettes therein, and means for discharging the gases, and means whereby the last named gases when reduced in temperature can be introduced back into the apparatus to keep the temperature thereof down.

In testimony whereof I have hereunto affixed my signature.

HENRY F. MAUREL.